March 31, 1959 M. J. SWING 2,880,368

COUPLING NETWORK

Filed June 20, 1957

INVENTOR:
MERVIN SWING,

BY Donald N. Timbie
HIS ATTORNEY.

United States Patent Office 2,880,368

Patented Mar. 31, 1959

2,880,368

COUPLING NETWORK

Mervin J. Swing, Liverpool, N.Y., assignor to General Electric Company, a corporation of New York Application June 20, 1957, Serial No. 666,909

1 Claim. (Cl. 315—30)

Figure 1:
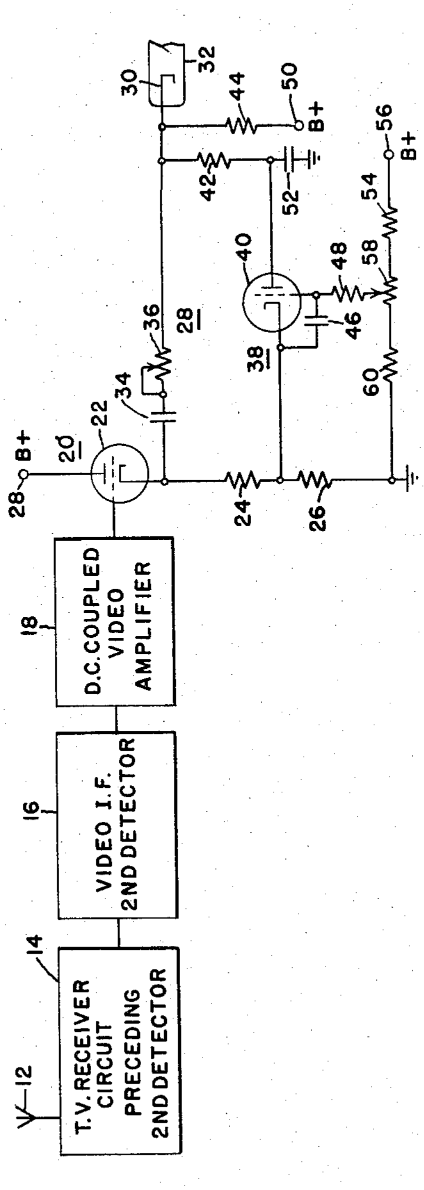

The present invention relates to a network for independently coupling the A.C. and D.C. components of a signal from one stage of a circuit to another stage.

A video signal at the second detector of a television receiver contains a D.C. component corresponding to the average brightness of the scene being televised, and A.C. components corresponding to the detailed makeup of the scene. In all television receivers the A.C. components must be utilized and in some monochrome and in all polychrome television receivers it is desirable to apply the D.C. component to the picture tube in order to obtain a faithful reproduction of the televised scene. There are two methods of applying this D.C. component to the picture tube: D.C. restoration and D.C. coupling.

The method of D.C. restoration is employed when an A.C. network is utilized to couple the video signal to the picture tube. The coupling capacitors in the A.C. network block the D.C. component and pass only the A.C. components. In order to get a D.C. component, a D.C. restorer is employed to produce a D.C. voltage corresponding to the average brightness of the televised scene, which voltage is applied to the grid or cathode of the picture tube. In television receiver manufacturing there is a tendency away from the use of the D.C. restorer because it is more expensive than the direct coupling system and also because the D.C. restorer does not function so well at the low impedance levels existing in polychrome receivers.

Previous methods of D.C. coupling comprised the simple expedient of a direct connection between the cathode of the picture tube and the output electrode of the last tube in the second detector. Or if an amplifier was used to amplify the detected signal, the connection was to the output electrode of the last tube in the amplifier. The contrast control and the brightness control were separated because if they were in the same coupling network, the brightness control would affect the contrast and the contrast control would affect the brightness. In some cases the contrast control was placed between the video detector and the cathode (or cathodes) of the picture tube and the brightness control was placed in the grid circuit. This coupling method did not work very well in a polychrome picture tube because the brightness control should be in the same electrode circuit with the contrast control in order to simply and inexpensively control the brightness and maintain a satisfactory gray scale. Thus, it is desirable to couple the A.C. and D.C. components to the same picture tube electrode but also to have independent control of the magnitudes of these components.

Accordingly, it is an object of the present invention to provide a coupling network for coupling A.C. and D.C. signals from one point in a circuit to another point while permitting independent control of the magnitudes of the A.C. and D.C. signals.

It is a further object to provide a network for coupling the A.C. and D.C. video signals to the same input electrode of a picture tube while permitting independent control of the magnitudes of the A.C. and D.C. video signals.

Not only should the contrast and brightness controls be independent of each other, but also they should have no effect on the bias of the tube energizing the coupling network. These requirements cannot readily, if at all, be met by simple RC networks inserted between the cathode of the picture tube and the output tube of the second detector.

Thus, another object is to provide a video coupling network that does not affect the bias on the tube energizing the network.

These and other objects are obtained in accordance with one form of my invention by means including a D.C. amplifier circuit and an A.C. coupling circuit connected in parallel between the output of the second detector (or the output of an amplifier following this detector) and the cathode or cathodes of the picture tube. The contrast control is placed in the A.C. circuit so that it affects only the A.C. components and the brightness control is connected to affect only the operation of the D.C. amplifier. Because the contrast control is only A.C. coupled to the output of the video second detector it has no effect upon the D.C. bias of this detector or any stage between this detector and the coupling network. Also, the brightness control doesn't affect this bias for reasons that will be shown.

Figure 2:
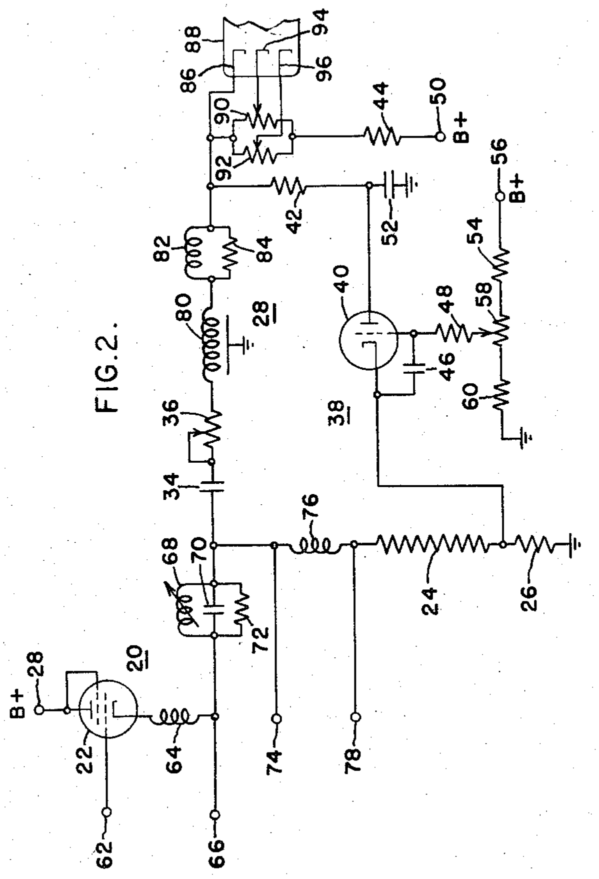

The features of my invention which I believe to be novel are set forth with particularity in the appended claim. My invention itself, however, both as to its organization and method of operation, together with further objects and advantages thereof, may best be understood by reference to the following description taken in connection with the accompanying drawing, in which:

Fig. 1 is a circuit and block diagram of a monochrome television receiver in which an embodiment of my invention is utilized, and Fig. 2 is a circuit diagram of an embodiment of my invention that can be used in a polychrome television receiver.

Referring to the circuit diagram of Fig. 1, there is shown a television antenna 12 for energizing the input to the portion 14 of the television receiver circuit preceding the second detector. This portion of the circuit is so well known to those skilled in the art that it has been illustrated only as a block component. The second detector 16, being well known, is also shown in block component form. Detector 16 removes the I.F. (intermediate frequency) components of the video signals leaving only the video signals for energizing the input of a D.C. coupled video amplifier 18. This amplifier is not required if a high gain picture tube is used. The output of amplifier 18 is connected directly to an impedance matching means here shown to be a cathode follower circuit 20. This impedance matching means is usually necessary if a good frequency response and signal coupling are to be obtained because the impedance of the output of second detector 16 or of the video amplifier 18 is rather high and the input impedance of the picture tube circuitry is rather low. The cathode follower 20 comprises a triode 22 with two cathode load resistors 24 and 26. A B+ terminal 28 is joined to the plate of this triode. An A.C. passing network 28 couples impedance matching means 20 to the cathode 30 of picture tube 32. Network 28 comprises a D.C. blocking capacitor 34 joined in series with a contrast control means that is shown to be a potentiometer 36. A D.C. passing network 38 couples the junction between resistors 24 and 26 to cathode 30. This network is a D.C. amplifier having an electron discharge device shown to be a triode 40 with two series connected plate load resistors 42 and 44. Triode 40 has an A.C. by-pass capacitor 46 joined between cathode and grid for maintaining these tube electrodes at the same A.C. potential. A grid resistor 48 protects triode 40 due to the protecting self-bias that is developed across it whenever the grid is driven positive. One end of plate resistor 44 is joined to a B+ terminal 50, and the other end, which is at the junction between resistors 42 and 44, is joined to cathode 30. Because resistors 42 and 44 have an end connected to cathode 30 they are also load resistors for the A.C. components in network 28. In fact potentiometer 36 of network 28 acts in a voltage dividing fashion with these resistors to control the portion of the A.C. video components that are applied to cathode 30. These A.C. components are isolated from amplifier 40 by an A.C. by-pass capacitor 52 that is connected to the plate of triode 40. The amplification of amplifier 40, is controlled by a brightness control comprising a voltage dropping resistor 54 having one end joined to B+ terminal 56, a potentiometer 58, and another voltage dropping resistor 60. Resistors 54 and 60 ensure that potentiometer 56 operates in the correct voltage range for controlling the operation of amplifier 40.

In the operation of the embodiment of Fig. 1, the A.C. video components in the output of cathode follower 20 are conducted by network 28 to the cathode 30 but the D.C. component is blocked by capacitor 34. The magnitudes of the A.C. components energizing cathode 30, which of course determine the contrast in the viewed picture, can be controlled by the setting of potentiomter 36. If this potentiometer is adjusted to present a large impedance in comparison to the parallel combination of resistors 42 and 44, then most of the magnitude of the A.C. components appear across it. But if this potentiometer is adjusted to present a relatively low impedance almost all of the magnitude of the A.C. components appears at cathode 30. There are an infinite number of gradations that can be had between these two extreme settings of potentiometer 36 and thus the desired contrast can be set.

The video D.C. component is amplified by amplifier 40 and applied to cathode 30 by means of the plate resistors 42 and 44. Amplification of the D.C. component is necessary due to the loss in this component across resistor 24. Resistor 24 is selected to be a high value relative to resistor 26 so that it can isolate the A.C. passing network 28 from the low capacitative reactances of the D.C. passing network 38. Resistor 24 is also chosen to be of a high value relative to resistor 26 so that the voltage developed across it by the cathode current of tube 22 is much greater in magnitude than the voltage developed across resistor 26 by the combined cathode currents of tubes 22 and 40. Thereby, the voltage generated by the current from tube 40 in the cathode circuit of tube 22 does not have an appreciable effect upon the bias of tube 22. If it were otherwise, the operation of network 38 would have an effect upon network 28. With a high value, resistor 24 severely attenuates the D.C. component and thus it must be amplified by tube 40 so that it has its proper magnitude relative to the magnitudes of the A.C. components. The brightness control controls the gain of amplifier 40 and thereby the magnitude of the D.C. component applied to cathode 30.

The A.C. passing network 28 cannot affect the bias of cathode follower 20 due to the blocking action of capacitor 34. Also, the D.C. passing network 38 does not affect the bias because the voltage developed by its across resistor 26 is too small to be significant.

Referring now to the embodiment shown in Fig. 2, the components in this figure having corresponding components in Fig. 1 have been given the same designating reference numerals. In order to simplify the drawing in Fig. 2 the circuits including the second detector and the circuits in the receiver preceding the second detector are not shown. In Fig. 2 a terminal 62 is provided for the input to tube 22. The output of the second detector or the amplifier following the detector, if any, connects to this terminal. A choke 64, placed in the cathode circuit of cathode follower 20, eliminates some of the high harmonics present in the video signal. At one end of choke 64 there is a terminal 66 from which the chrominance signal can be taken. Also at this end there is a chroma trap comprising a variable inductor 68 in parallel with a capacitor 70, and a resistor 72 that establishes the Q of the trap. At the output of the trap there is a terminal 74, from which the synch signals can be taken, and a choke 76 that provides high frequency peaking. At an end of choke 76 there is a terminal 78 to which the A.G.C. keyer can be connected. In the A.C. passing network 28 a delay line 80 is inserted to delay the luminance signal with respect to the chrominance signal. The output of this delay line energizes a constant impedance network that includes a parallel combination of a choke 82 and a resistor 84. One end of this parallel combination is joined directly to the red cathode 86 of color tube 88 and indirectly through potentiometers 90 and 92 to the blue cathode 94 and green cathode 96, respectively. These potentiometers apportion the correct amount of luminance signal to the green and blue cathodes so that good gray scale tracking is obtained. The D.C. passing network of Fig. 2 is the same as that of Fig. 1.

The operation of the circuit of Fig. 2 in regards to coupling the A.C. and D.C. video signal to the cathodes of picture tube 88 is the same as the explained operation of the circuit of Fig. 1. Only the A.C. video components can pass through network 28 due to the presence of capacitor 34 and only the D.C. video component can pass through network 38 due to the A.C. by-pass capacitors 46 and 52. Thus the contrast control 36 in network 28 affects only the A.C. components and the brightness control in the network 38 affects only the D.C. component.

Although the invention has been described by reference to a particular embodiment thereof, it will be understood that numerous modifications can be made by those skilled in the art without departing from the invention. I therefore aim in the appended claim to cover all such equivalent variations as come within the true spirit and scope of my invention.

What I claim as new and desire to secure by Letters Patent of the United States is:

A network for coupling video signals having A.C. and D.C. components to a control electrode of a cathode ray tube in such manner as to provide separate control of the amplitude of the A.C. and D.C. components applied to the cathode comprising a source of video signals having A.C. and D.C. components, a cathode follower electron discharge device having an anode, a control grid and a cathode, means for connecting the output of said source to said control grid, a point of positive potential, a connection between said anode and said point of positive potential, a cathode circuit for said cathode follower including a large resistor and a small resistor connected in series in the order named between said cathode of said cathode follower amplifier and ground, a capacitor and a variable resistor connected in series between said cathode of said cathode follower and said cathode of said cathode ray tube, a load resistance connected between said cathode of said cathode ray tube and a point of positive potential, a resistor and a capacitor connected in series between said cathode of said cathode ray tube and ground, an amplifier having an anode, a control grid and a cathode, a connection between said latter anode and a point between said latter resistor and capacitor, a connection between said latter cathode and a point between said small and large resistors, a capacitor connected between said latter cathode and control grid, a source of variable positive voltage, and a connection between said source and said latter control grid.

References Cited in the file of this patent

UNITED STATES PATENTS

| | | |
|---|---|---|
| 2,706,265 | Buehler | Apr. 12, 1955 |
| 2,775,657 | Van Zelst | Dec. 25, 1956 |
| 2,778,883 | Buckerfield | Jan. 22, 1957 |
| 2,794,866 | Dert | June 4, 1957 |